Sept. 16, 1952 G. C. LARSON 2,611,111
RADIO APPARATUS
Filed Feb. 3, 1950
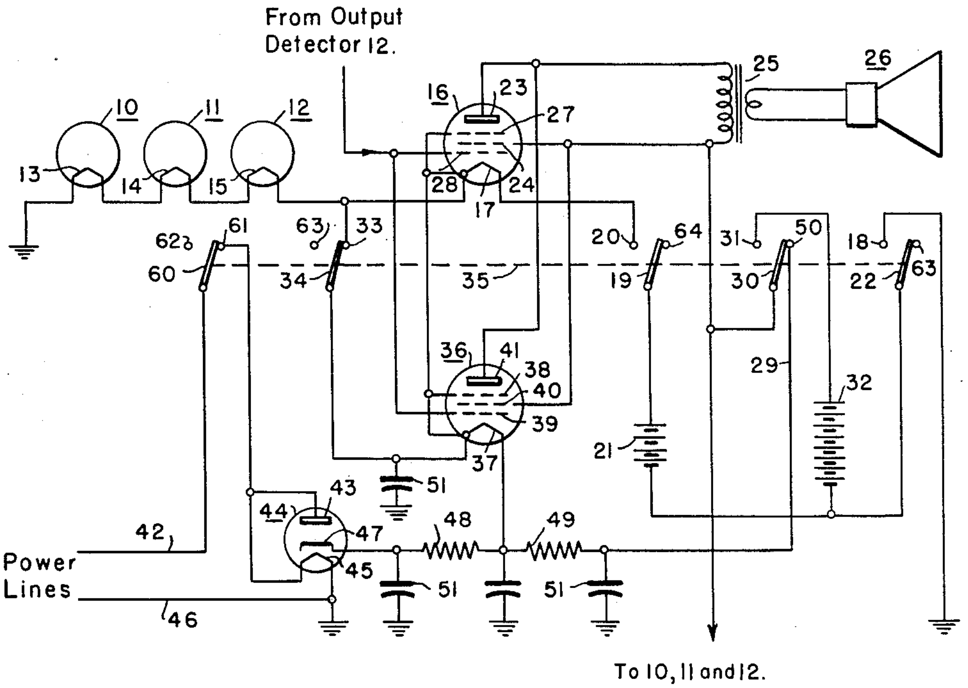
WITNESSES:
E. A. McCloskey.
Wm. C. Groome
INVENTOR
Gilbert C. Larson.
BY
F. E. Browder
ATTORNEY Patented Sept. 16, 1952

2,611,111

UNITED STATES PATENT OFFICE 2,611,111

RADIO APPARATUS

Gilbert C. Larson, Sunbury, Pa., assignor to Westinghouse Electric Corporation, East Pittsburgh, Pa., a corporation of Pennsylvania Application February 3, 1950, Serial No. 142,287

8 Claims. (Cl. 315—96)

This invention relates to electronic apparatus, and it relates more particularly to radio receivers of the type which are adapted to be operated from batteries, or from alternating or direct-current power lines.

A satisfactory type of portable radio receiver uses vacuum tubes having filaments, serving as cathodes, which are heated from the plate voltage supply circuit when the receiver is operating from power lines, and which are heated by batteries when power lines are not available. The output tubes used for battery operation have limited power-handling capacity, and it is customary to employ switching mechanism for substituting a more powerful output tube for the battery-operated output tube when the receiver is operated from power lines.

An object of this invention is to simplify the circuit of a radio receiver using a battery-operated output tube when the receiver is operating from batteries, and using a higher capacity output tube when the receiver is operated from power lines.

Another object of the invention is to simplify the switching mechanism required for substituting a higher capacity output tube in a radio receiver for a battery-operated one when the receiver is operated from power lines.

Another object of the invention is to reduce the number of components required in a radio receiver using one output tube energized by batteries, and using another output tube energized from power lines.

Another object of the invention is to reduce the power required for a radio receiver when an output tube energized by power lines is substituted for a battery-energized output tube.

The invention will now be described with reference to the drawing which is a circuit schematic illustrating a portable radio receiver embodying the invention.

The receiver illustrated has a conventional superheterodyne circuit comprising the oscillator-mixer tube 10, the intermediate frequency amplifier tube 11 and the second detector tube 12. The tubes 10, 11, and 12 have the filamentary cathodes 13, 14, and 15, respectively. The input and output circuits of these tubes are not illustrated since forming no part of this invention.

The battery-energized, audio output tube 16 has a filament 17 serving as its cathode, which is connected in series with the filaments 13, 14, and 15, the "A" battery 21 and ground, when the switch 19 is on the contact 20, and when the battery switch 22 is on the contact 18.

The output tube 16 has its plate 23 and its screen grid 24 connected to the opposite ends of the primary winding of the output transformer 25, the secondary winding of which is connected to the voice coil of the loud-speaker 26. The suppressor grid 27 of the tube 16 is connected to its filament 17, and its control grid 28 is connected to the output circuit of the detector tube 12 as is conventional.

One side of the primary winding of the output transformer 25 is connected to the switch 30 which is connected through the wiring 29, a portion only of which is shown, to the plates and the screen grids of the tubes 10, 11, and 12, and which, when the receiver is battery operated, is on the contact 31, which is connected to the positive terminal of the "B" battery 32. The minus terminal of the battery 32 is connected to ground when the switch 22 is on the contact 18.

The series connection between the filament 15 of the tube 12 and the filament 17 of the tube 16 is connected to the contact 33 of the switch 34. When the receiver is battery operated, the switch 34 is spaced from the contact 33.

The output tube 36 is a power output tube having several times the power-handling capacity of the tube 16. It has a filament 37 which draws the same current as the filaments of the tubes 10, 11, and 12 which, for example, may be 50 milliamperes, and has a filament voltage of about 100 volts. Its filament 37, which serves as its cathode, is connected to the filament 17 of the output tube 16, and its control grid 39, its screen grid 40, and its plate 41 are connected to the control grid 28, the screen grid 24 and the plate 23, respectively, of the output tube 16. Its suppressor grid 38 is connected to its filament 37.

The power line 42 is adapted to be connected through the switch 60 and its contact 61 to the plate 43 of the rectifier tube 44 and to one side of its filament 45, the other side of which is connected to the power line 46 and to ground. The indirectly heated cathode 47 of the rectifier tube 44 is connected through the series-connected filter resistors 48 and 49 to the contact 50 of the switch 30. The capacitors 51 are the usual filter capacitors.

One side of the filament 37 of the output tube 36 is connected to the junction point of the resistors 48 and 49, and its other side is connected to the switch 34.

The switches 60, 34, 19, 30, and 22 are interconnected by the linkage 35 so that they can be simultaneously adjusted for switching the receiver from battery operation to power line operation and vice versa. These switches can be "ganged" so as to be operated by a single control knob.

When the receiver is to be battery operated, the switches 60, 34, 19, 30, and 22 are moved from the positions shown by the drawing, to the left facing the drawing so that they touch the contacts 62, 63, 20, 31, and 18, respectively. The contacts 62 and 63 are not connected in the circuit. This results in the switch 60 being spaced from the contact 61 thereby disconnecting the receiver from the power lines, and results in the switch 34 being spaced from the contact 33 thereby disconnecting the filament 37 of the output tube 36 from the filaments of the tubes 10, 11, and 12. It also results in the switch 19 touching the contact 20, thereby connecting the filaments of the tubes 10, 11, 12 and 16 in series with the "A" battery 21. It also results in the switch 30 touching the contact 31 and connecting the primary winding of the output transformer 25 to the positive terminal of the "B" battery 32. It also results in the switch 22 touching the contact 18 and thereby completing the circuit for energizing the filaments of the tubes 10, 11, 12, and 16 from the "A" battery. At this time, the output tube 36 is deenergized and the output tube 16 energizes the loud-speaker 26.

When the receiver is to be operated from power lines, the switches 60, 34, 19, 30, and 22 are moved to the right, facing the drawing, to the positions illustrated thereby. This results in the switches 22 and 30 leaving the contacts 18 and 31 respectively, thereby disconnecting the "A" and "B" batteries from the tubes, and results in the switch 30 touching the contact 50, thereby connecting the wiring 29 and the output transformer 25 to the filter resistor 49. It also results in the switch 34 moving against the contact 33, thereby connecting the filaments 13, 14, and 15 of the tubes 10, 11, and 12, respectively, in series with the filament 37 of the output tube 36 which, being connected to the junction point of the series-connected filter resistors 48 and 49, causes the filaments of the tubes 10, 11, 12, and 36 to be energized by current from the rectifier tube 44. It also results in the switch 60 moving against the contact 61, thereby energizing the rectifier tube 44 from the power lines. At this time, the output tube 16 is deenergized since its filament circuit is open, and the output tube 36 energizes the loud-speaker 26.

In prior circuits in which the filaments of the tubes corresponding to the tubes 10, 11, and 12 were energized from the rectifier circuit, a voltage dropping or ballast resistor was used for reducing the relatively high voltage from the rectifier so as to avoid burning out the filaments of the tubes. In this invention, the filament of the output tube 36 replaces such a ballast resistor and eliminates its expense. This invention also provides improved efficiency by utilizing the power which is normally dissipated in a ballast resistor for heating the filaments of the higher power output tube.

Another advantage of this invention is that although a large capacity output tube is used when the receiver is operated from power lines, no more filament power is consumed than is consumed in receivers using battery output tubes when operated from power lines.

Another advantage of this invention is that the switching of the output tubes is accomplished simply and inexpensively.

I claim as my invention:

1. Electronic apparatus comprising a plurality of electron tubes having filaments connected in series, a battery, a first output electron tube having a filament, means including a first switch operable for connecting said first-mentioned filaments and said filament of said output tube in series with said battery, a second outupt electron tube having a filament, a rectifier circuit, and means including a second switch operable for connecting said first-mentioned filaments and said filament of said second output tube in series to said rectifier circuit.

2. Electronic apparatus comprising a plurality of electron tubes having filaments connected in series, a battery, first and second output electron tubes having filaments, a rectifier circuit, and switching means for connecting said first-mentioned filaments and the filament of one of said output tubes in series with said battery, or alternatively for connecting said first-mentioned filaments and the filament of the other of said output tubes in series to said rectifier circuit.

3. Electronic apparatus comprising a plurality of electron tubes having filaments connected in series, a battery, first and second output electron tubes having filaments, a rectifier circuit, and switching means operable in one position to connect said first-mentioned filaments and the filament of one of said output tubes in series with said battery, and operable in another position to connect said first-mentioned filaments and the filament of the other of said output tubes in series to said rectifier circuit.

4. Electronic apparatus comprising a plurality of electron tubes having filaments connected in series, first and second output electron tubes having filaments and anodes, a filament-energizing battery, an anode supply battery, a rectifier circuit, and switching means for connecting said first-mentioned filaments and the filament of said first output tube in series with said filament-energizing battery and for connecting the anode of said first output tube to said anode supply battery, or alternatively for connecting said first-mentioned filaments and the filament of said second output tube in series to said rectifier circuit, and for connecting the anode of said second output tube to said rectifier circuit.

5. Electronic apparatus comprising a plurality of electron tubes having filaments connected in series, first and second output electron tubes having filaments and anodes, a filament-energizing battery, an anode supply battery, a rectifier circuit, and interconnected switching means operable in one position for connecting said first-mentioned filaments and the filament of said first output tube in series with said filament-energizing battery, and for connecting the anode of said first output tube to said anode supply battery, and operable in another position for connecting said first-mentioned filaments and the filament of said second output tube in series to said rectifier circuit and for connecting the anode of said second output tube to said rectifier circuit.

6. A radio receiver comprising a plurality of electron tubes having filaments connected in series, first and second output electron tubes having filaments, having control grids and having anodes, means connecting said control grids together, an output transformer having a primary winding, means connecting said anodes together and to said winding, a filament-energizing battery, an anode supply battery, a rectifier circuit, and switching means for connecting said first-mentioned filaments and the filament of said first output tube in series with said filament-energizing battery, and for connecting said winding to said anode supply battery, or alternatively for connecting said first-mentioned filaments and the filament of said second output tube in series to said rectifier circuit, and for connecting said winding to said rectifier circuit.

7. A radio receiver comprising a plurality of electron tubes having filaments connected in series, first and second output electron tubes having filaments, having control grids and having anodes, means connecting said grids together, an output transformer having a primary winding, means connecting said anodes together and to said winding, a filament-energizing battery, an anode supply battery, a rectifier circuit, and interconnected switching means operable in one position for connecting said first-mentioned filaments and the filament of said first output tube in series with said filament-energizing battery, and for connecting said winding to said anode supply battery, and operable in another position for connecting said first-mentioned filaments and the filament of said second output tube in series to said rectifier circuit, and for connecting said winding to said rectifier circuit.

8. A radio receiver comprising a plurality of electron tubes having filaments connected in series, first and second output electron tubes having filaments, having control grids and having anodes, means connecting said grids together, an output transformer having a primary winding, means connecting said anodes together and to said winding, a filament-energizing battery, an anode supply battery, a rectifier, a power line connection for said rectifier, and interconnected switching means operable in one position for connecting said first-mentioned filaments and the filament of said first output tube in series with said filament-energizing battery, and for connecting said winding to said anode supply battery, and operable in another position for connecting said connection to said rectifier, for connecting said first-mentioned filaments and the filament of said second output tube in series to said rectifier, and for connecting said winding to said rectifier.

GILBERT C. LARSON.

REFERENCES CITED

The following references are of record in the file of this patent:

UNITED STATES PATENTS

| Number | Name | Date |
|---|---|---|
| 2,220,051 | Israel | Oct. 29, 1940 |
| 2,222,196 | Vilkomerson | Nov. 19, 1940 |
| 2,269,989 | Root | Jan. 13, 1942 |